(12) United States Patent
Outwater et al.

(10) Patent No.: US 11,663,867 B2
(45) Date of Patent: *May 30, 2023

(54) DIGITAL CERTIFICATE AND RESERVATION

(71) Applicant: Urban Intel, Inc., Seattle, WA (US)

(72) Inventors: Chris Outwater, Carpinteria, CA (US); William Gibbens Redmann, Glendale, CA (US)

(73) Assignee: Urban Intel, Inc., Seattle, WA (US)

( * ) Notice: Subject to any disclaimer, the term of this patent is extended or adjusted under 35 U.S.C. 154(b) by 246 days.

This patent is subject to a terminal disclaimer.

(21) Appl. No.: 17/085,944

(22) Filed: Oct. 30, 2020

(65) Prior Publication Data

US 2021/0058384 A1 Feb. 25, 2021

Related U.S. Application Data

(63) Continuation of application No. 15/900,374, filed on Feb. 20, 2018, now Pat. No. 10,826,885, which is a
(Continued)

(51) Int. Cl.
*H04L 9/40* (2022.01)
*G07C 9/27* (2020.01)
(Continued)

(52) U.S. Cl.
CPC ............. *G07C 9/27* (2020.01); *B60L 53/305* (2019.02); *B60L 53/65* (2019.02); *B60L 53/68* (2019.02);
(Continued)

(58) Field of Classification Search
CPC ... G07C 9/27; G07C 9/20; G07C 9/29; G07C 2209/08; H04W 4/80; H04W 12/069; H04W 12/08; B60L 53/68; B60L 53/305; B60L 53/65; B60L 2240/622; B60L 2240/72; B60L 2240/80; B60L 2250/10; H04M 1/72412; G06Q 10/02; G06Q 20/045; G06Q 20/322; G06Q 20/3223; G06Q 20/3278; G06Q 20/3215;
(Continued)

(56) References Cited

U.S. PATENT DOCUMENTS 6,975,202 B1 * 12/2005 Rodriguez ......... G07C 9/00571
340/5.67
7,181,426 B2 * 2/2007 Dutta .................... G06Q 10/02
705/37
(Continued)

FOREIGN PATENT DOCUMENTS

WO 2005017840 A1 2/2005

*Primary Examiner* — Ghodrat Jamshidi
(74) *Attorney, Agent, or Firm* — Kasha Law LLC; John R. Kasha; Kelly L. Kasha (57) ABSTRACT

An access device is provided for use in an access control system. The access device includes a processor having control of a door lock, and a communication module connected to the processor. The processor is able to receive a reservation certificate presented by a portable terminal through the communication module. The processor activates the door lock when the current reservation certificate has been presented and disables an alarm system when the current reservation certificate has been presented.

20 Claims, 7 Drawing Sheets

Related U.S. Application Data continuation-in-part of application No. 15/178,849, filed on Jun. 10, 2016, now Pat. No. 9,911,258, which is a continuation of application No. 14/603,434, filed on Jan. 23, 2015, now Pat. No. 9,373,205, which is a continuation of application No. 13/582,467, filed as application No. PCT/US2011/026781 on Mar. 2, 2011, now Pat. No. 8,996,876.

(60) Provisional application No. 62/461,574, filed on Feb. 21, 2017, provisional application No. 61/309,813, filed on Mar. 2, 2010.

(51) Int. Cl.

| | |
|---|---|
| *H04W 12/08* | (2021.01) |
| *G06Q 20/32* | (2012.01) |
| *G06Q 20/38* | (2012.01) |
| *G06Q 50/06* | (2012.01) |
| *H04L 9/32* | (2006.01) |
| *G06Q 10/02* | (2012.01) |
| *G06Q 20/04* | (2012.01) |
| *G07F 15/00* | (2006.01) |
| *G07F 5/26* | (2006.01) |
| *G06Q 30/06* | (2023.01) |
| *H04W 4/80* | (2018.01) |
| *B60L 53/68* | (2019.01) |
| *B60L 53/65* | (2019.01) |
| *B60L 53/30* | (2019.01) |
| *G07C 9/20* | (2020.01) |
| *G07C 9/29* | (2020.01) |
| *H04M 1/72412* | (2021.01) |
| *H04W 12/069* | (2021.01) |

(52) U.S. Cl.
CPC ........... *G06Q 10/02* (2013.01); *G06Q 20/045* (2013.01); *G06Q 20/322* (2013.01); *G06Q 20/3223* (2013.01); *G06Q 20/3278* (2013.01); *G06Q 20/3829* (2013.01); *G06Q 20/38215* (2013.01); *G06Q 30/06* (2013.01); *G06Q 50/06* (2013.01); *G07C 9/20* (2020.01); *G07C 9/29* (2020.01); *G07F 5/26* (2013.01); *G07F 15/005* (2013.01); *H04L 9/3247* (2013.01); *H04L 9/3263* (2013.01); *H04L 9/3268* (2013.01); *H04L 9/3297* (2013.01); *H04L 63/0428* (2013.01); *H04L 63/0807* (2013.01); *H04L 63/0823* (2013.01); *H04L 63/102* (2013.01); *H04M 1/72412* (2021.01); *H04W 4/80* (2018.02); *H04W 12/069* (2021.01); *H04W 12/08* (2013.01); *B60L 2240/622* (2013.01); *B60L 2240/72* (2013.01); *B60L 2240/80* (2013.01); *B60L 2250/10* (2013.01); *G06Q 2240/00* (2013.01); *G07C 2209/08* (2013.01); *H04L 63/0442* (2013.01); *H04L 2209/56* (2013.01); *H04L 2209/80* (2013.01); *H04L 2209/84* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC ......... G06Q 20/38215; G06Q 20/3829; G06Q 30/06; G06Q 50/06; G06Q 2240/00; G07F 5/26; G07F 15/005; H04L 9/3247; H04L 9/3263; H04L 9/3268; H04L 9/3297; H04L 63/0428; H04L 63/0807; H04L 63/0823; H04L 63/102; H04L 63/0442; H04L 2209/56; H04L 2209/80; H04L 2209/84; Y02T 10/70; Y02T 10/7072; Y02T 10/72; Y02T 90/12; Y02T 90/14; Y02T 90/16; Y02T 90/167; Y04S 30/14

See application file for complete search history.

(56) References Cited

U.S. PATENT DOCUMENTS

| | | | |
|---|---|---|---|
| 7,353,396 B2* | 4/2008 | Micali | G07F 7/1016 713/176 |
| 7,694,330 B2* | 4/2010 | Kung | H04L 9/3263 726/9 |
| 8,998,695 B2* | 4/2015 | Muir | G07F 17/3239 463/16 |
| 2003/0154169 A1* | 8/2003 | Yanai | G06Q 10/02 705/65 |
| 2003/0194089 A1* | 10/2003 | Kansala | G07C 9/00571 380/270 |
| 2003/0208386 A1* | 11/2003 | Brondrup | G06Q 10/02 705/5 |
| 2008/0301461 A1* | 12/2008 | Coulier | G06F 21/34 713/184 |
| 2010/0031043 A1* | 2/2010 | Burger | G06F 21/32 713/170 |
| 2011/0084799 A1* | 4/2011 | Ficko | G07C 9/27 340/5.65 |

* cited by examiner

DIGITAL CERTIFICATE AND RESERVATION

CROSS-REFERENCE TO RELATED APPLICATION

This application is a continuation of U.S. patent application Ser. No. 15/900,374, filed Feb. 20, 2018, which is a continuation-in-part of U.S. patent application Ser. No. 15/178,849, filed Jun. 10, 2016, now U.S. Pat. No. 9,911,258, which is a continuation of U.S. patent application Ser. No. 14/603,434, filed Jan. 23, 2015, now U.S. Pat. No. 9,373,205, which is a continuation of U.S. patent application Ser. No. 13/582,467, filed Sep. 4, 2012, now U.S. Pat. No. 8,996,876, which is a national stage application of PCT Application No. PCT/US11/26781, filed Mar. 2, 2011, which claims the benefit of U.S. Provisional Patent Application No. 61/309,813, filed Mar. 2, 2010. U.S. patent application Ser. No. 15/900,374 also claims the benefit of U.S. Provisional Patent Application No. 62/461,574, filed Feb. 21, 2017. All of the above mentioned applications are incorporated by reference herein in their entireties.

INTRODUCTION

Wireless access devices such as hotel room locks and rented home, condominium, or apartment locks are gaining in popularity. It would be very desirable to have an easily accessed website that could provide reservation services. This website could interact with a user's cellular telephone to provide an electronic token or certificate that could be temporarily stored in the phone that could be passed on to an access device to allow access and provide any necessary parameters.

Burger in U.S. Published Patent Application number 2010/0031043 teaches a portable electronic authorization method for enabling a user interface on a computer operated by a user to cause the memory content of an electronic device distinct from the computer to be modified. Burger teaches using RFID tags to replace each typical document found in a person's wallet or purse. Burger fails to teach enabling an access device such as a hotel room lock.

It would be advantageous to have a system and method of reserving a hotel room or rented home, condominium, or apartment using a web page and then transferring a token or certificate to a cellular telephone which could then further transfer this token to an access device such as a room lock to authorize use of the hotel room or rented home, condominium, or apartment.

DESCRIPTION OF THE FIGURES

Attention is now directed to several illustrations that show some of the features of the present invention.

Several illustrations and drawings have been presented to aid in understanding the present invention. The scope of the present invention is not limited to what is shown in the figures.

DESCRIPTION OF THE INVENTION

The present invention allows reservation and activation of an access device like a hotel room lock from a website via a digital token or certificate sent to a cellular telephone or smart phone.

Figure 1:
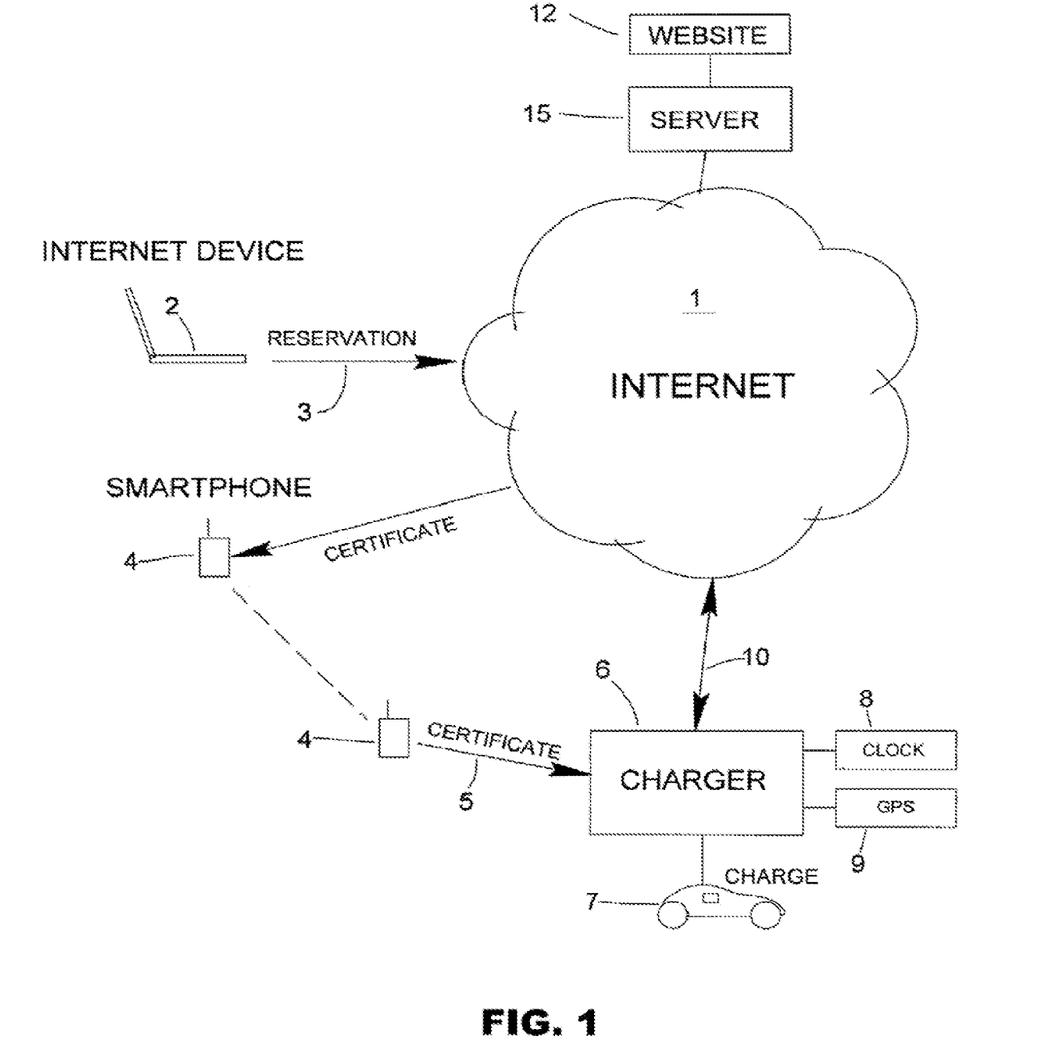
FIG. 1 shows a flow diagram of a reservation and charge from a web-enabled charger.

FIG. 1 shows a flow diagram of an embodiment of the present invention. A website 12 is hosted on a server 15 that communicates with the Internet 1. An Internet terminal device 2 such as a laptop or smart phone has communication with the server 15, browses the site 12 and initiates a reservation request 3 for charging or access. The website can be either open or secure. If secure, then generally a password is needed to access it. Communications security protocols such as https or IPSec may be used in any part of the system of the present invention.

The website 12 or server 15 can contain information about different services available including the location of possible vehicle chargers 6. The website or server will generally have a database which lists all chargers/locations (including possible maintenance closures) and all current reservations along with their status. The user can select where he wants to be charged or can be directed to the nearest charger in the system. The reservation 3 can be let for a certain time when charging will begin on a certain date. The user can also supply any parameters concerning charging necessary such as voltage/current requirements, time needed and the like.

After all of the information is gathered, the website causes the server 15 to send a particular digital token or certificate (a "reservation certificate" 5) to a particular portable terminal, e.g., a cellular telephone or smart phone 4 that the user specifies (which may the phone being used to make the reservation, but it does not need to be). All or part of the digital certificate may be encrypted with a public key for which the private key counterpart is known to only one charger or access device. Similarly, all or part of the digital certificate may be encrypted with a symmetrical key, known to both the server and the charger. All or part of the digital certificate may be encrypted with a private key known only to the server, but for which the public key is known to all compatible chargers, whereby the chargers can authenticate that the encryption was performed by the server. The certificate can contain a unique charger ID code for the target charger 6 or device, the date/time the certificate is issued, the date/time the charging is supposed to take place, the charging parameters, the charging time allocated, a new charger ID code that will replace the old ID, and optionally a new encryption key. Additionally, the certificate can contain communication information necessary to contact the device when in proximity to it, as discussed below. It is also possible that various portions of the message can be in plaintext. This makes it easier for a device to determine if any of many messages is for it without requiring decryption of every message. In this case, part of the certificate should include a hash of portions of the plaintext that would otherwise be exposed to tampering. The hash can then be encrypted by the server (e.g., with the server's private key) so that a charger or device is able to determine the authenticity of the certificate (by decrypting the hash with the server's public key and comparing that hash to one computed from the plaintext).

Figure 3:
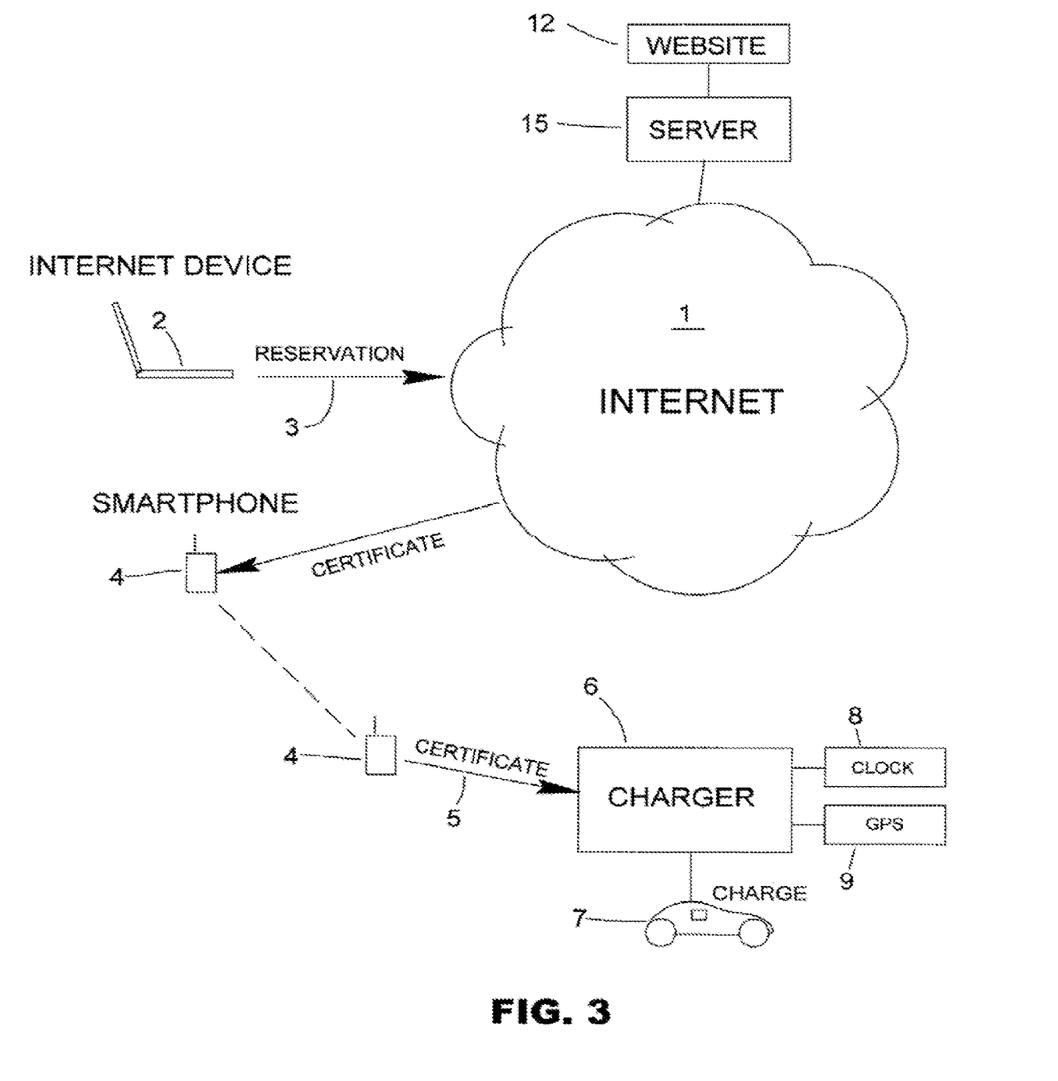
FIG. 3 shows a similar flow diagram to that of FIG. 1, except that the charger is not web-enabled.
Figure 4:
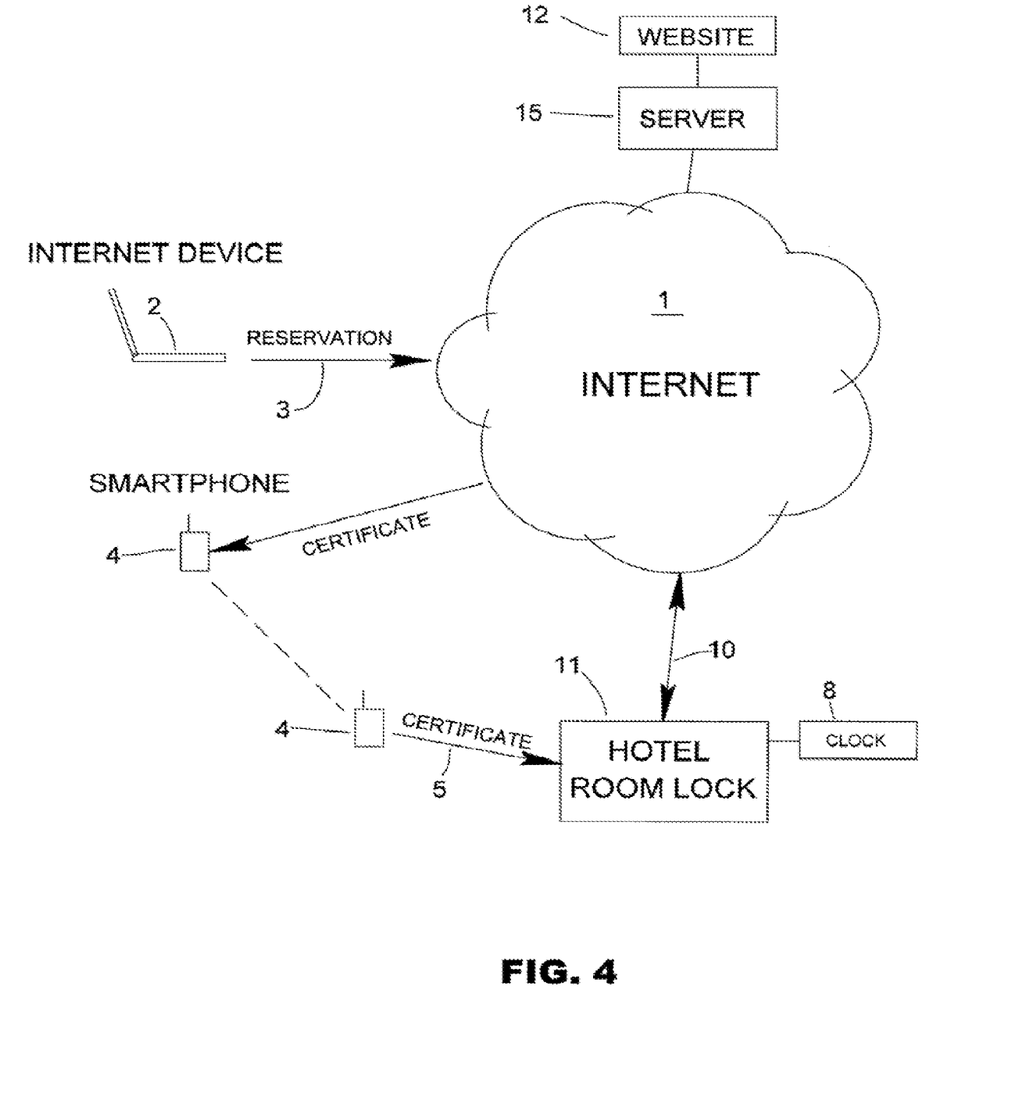
FIG. 4 shows the flow with a web-enabled hotel room lock.
Figure 5:
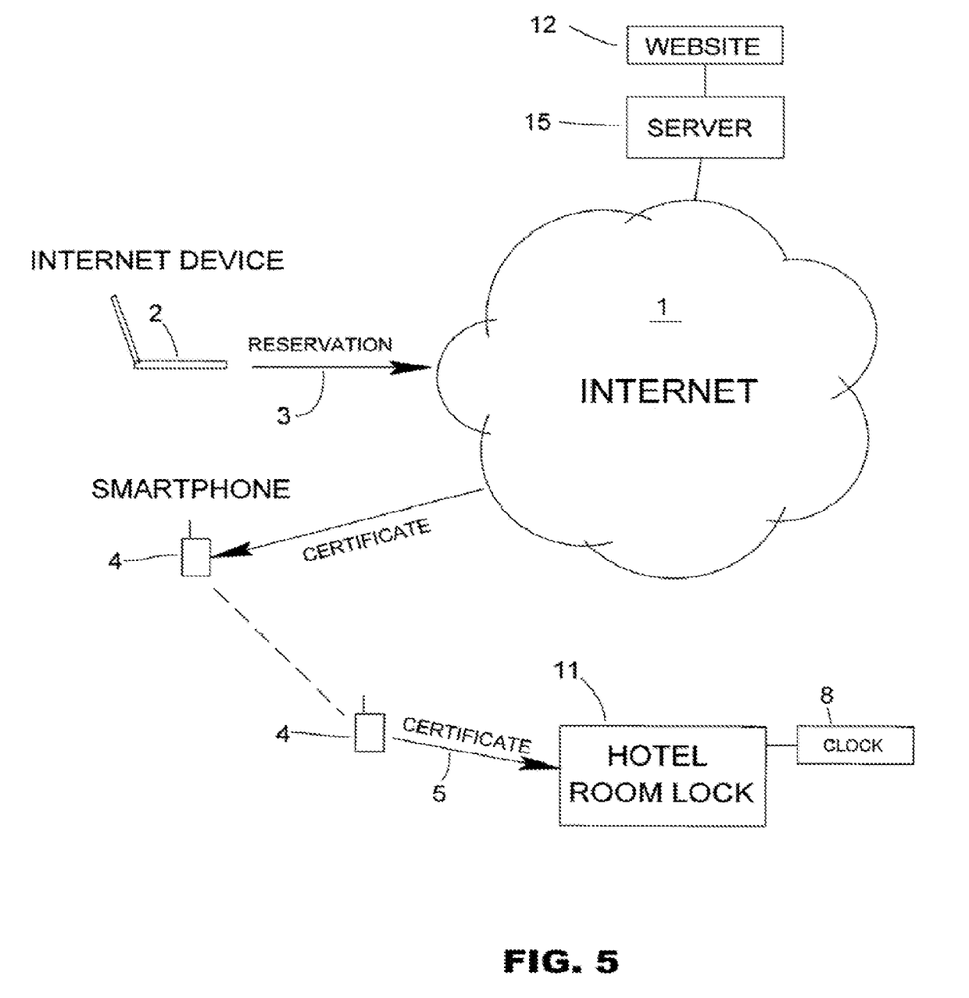
FIG. 5 shows the flow of FIG. 3 with a hotel room lock that is not web-enabled.

The charger 6 (or access device 11, shown in FIG. 4) may be Internet capable, having connection 10 to Internet 1, or optionally it may be unconnected to the Internet 1 (as shown in FIG. 3 and FIG. 5 with no connection 10). As the cellular telephone 4 approaches the charger 6 (or access device 11, shown in FIGS. 4 & 5), a wireless technology such as BLUETOOTH, Wi-Fi, Zigbee, infrared, or other wireless technique can be used to communicate with the charger or access device.

The charger may use these wireless techniques in a manner that does not advertise its presence, for instance, the BLUETOOTH service may not announce itself. In such cases as these, the application on the smart phone uses a predetermined communication setting, or obtains the appropriate communications settings (such as the network SSID, passcodes, IP addresses, Bluetooth ID, etc.) needed to contact the charger. In fact, with certain information (e.g., the Bluetooth ID) will allow the application to identify and communicate with a specific one of many chargers in proximity.

After a short communications handshake, the digital token or certificate 5 is sent to the charger or access device by short-range wireless. The charger 6 decrypts the certificate, if encrypted, reads the unique device ID, and decides if it is the correct device. If so, it reads the reservation time. If the reservation time approximately agrees with the time of day read from its internal time-of-day/date clock 8, it then decodes the charge parameters or access parameters, if any, and allows charging or access to take place. FIG. 1 shows a vehicle 7 being charged, and it shows the charger 6 with a time-of-day/date clock 8 and an optional GPS receiver 9. If the charger contains a GPS receiver, its identification can be by location, provided the charger has GPS access. This generally requires clear sky. The known coordinates or location of a charger can also be entered during installation, either from a map or predetermined table or from a GPS carried by an installer. If the charger 6 or access device 11 is Internet enabled (i.e., having connection 10), it can communicate with the website application via long-range wireless such as cellular or by wire access, or it can communicate with an Internet access point by Wi-Fi or the like.

Figure 2:
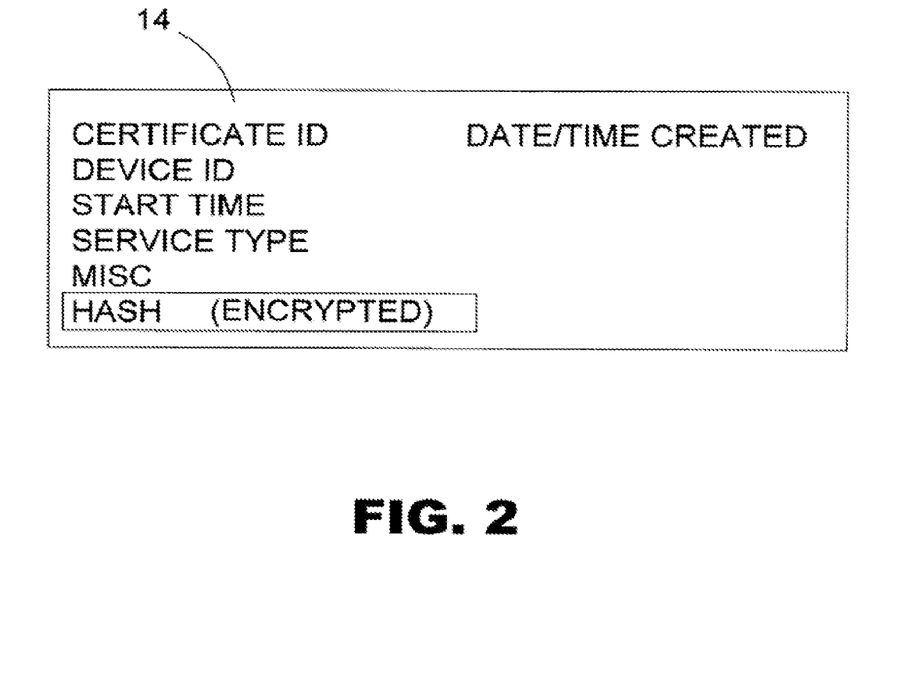
FIG. 2 shows an embodiment of a digital token or certificate.

FIG. 2 shows a sample certificate 14 (one embodiment of certificate 5) containing several fields of data representative of the reservation:

In some embodiments, one field is provided that can associate the certificate with the charger, such as a device identification (Device ID) of the charger 6 (so that the charger will have some suggestion that this is a message for it;

Start Time: this can be in plaintext so that the smart phone application can read it also;

Duration/End Time: if the reservation is not just for a predetermined time like all day for example;

Service Type: for example level 1 charging vs. level 2, if the charger supports multiple services.

For security, in some embodiments, the first portion of the certificate can be hashed, and the hash encrypted using the public key of the charger. Upon receipt by the charger, the hash is decrypted using the private key of the charger, and the hash result compared with the charger's internal hash calculation. If the two match, then nobody has edited the reservation and the certificate may be trusted as authentic. This is safe unless someone cracks the key of the charger. In that case, only one charger 6 is affected. An alternative embodiment may use a signed hash or checksum. Here, the hash is computed as above, then encrypted with a private key held by a trusted authority such as the website.

Upon receipt, anyone, including the smart phone and the charger, can use the trusted authority's public key to decrypt the hash and compare that to the hash they run. This method is safe unless someone cracks the private key of the website. In still another embodiment, a Signed-then-Encrypted Hash/Checksum is used. Here the signed hash is encrypted so that only the charger can read it. This way, the private keys of both the charger 6 and the website server 15 need to be compromised, and then only that charger is threatened.

The certificate 14 can contain a certificate ID that is unique only to this certificate that can be used for tracking and debugging. The date/time the certificate was issued, again for tracking and debugging, a unique device ID of the target device, the reservation start time and duration, any charging parameters needed, an optional new device ID for the next session and an optional new decryption key for the next session.

When charging or access is complete, the charger 6 or access device can update its ID to the new ID supplied by the previous certificate and optionally update its decryption key (if encryption is used). If the charger is Internet capable 10, it can notify the web site 12 that the charging is complete or that the changeover has taken place.

FIG. 3 shows the flow of FIG. 1 with the charger 6 not having Internet access. FIG. 4 shows an Internet capable access device 11, in this example a hotel room lock, having connection 10 to Internet 1, while FIG. 5 shows an access device 11 (again a hotel room lock) that cannot communicate over the Internet. In the case of a hotel room, a room reservation can be made using an Internet-enabled cellular telephone 4, laptop 2, computer or other Internet device. The room can be paid for in the usually e-commerce way by credit card or by any other payment method. The digital token or certificate is sent to the smart phone 4, and the user is told the external room number. As the guest approaches the hotel room door, the smart phone 4 sends the certificate 5 to the lock device by way of short-range wireless communication such as BlueTooth. The user can then unlock the door at any time during the stay period by pressing a particular button on the phone or by other technique. The phone can re-send the unique (and secret) access device ID to the device so that the device knows it is the correct person each time access is requested.

Figure 6:
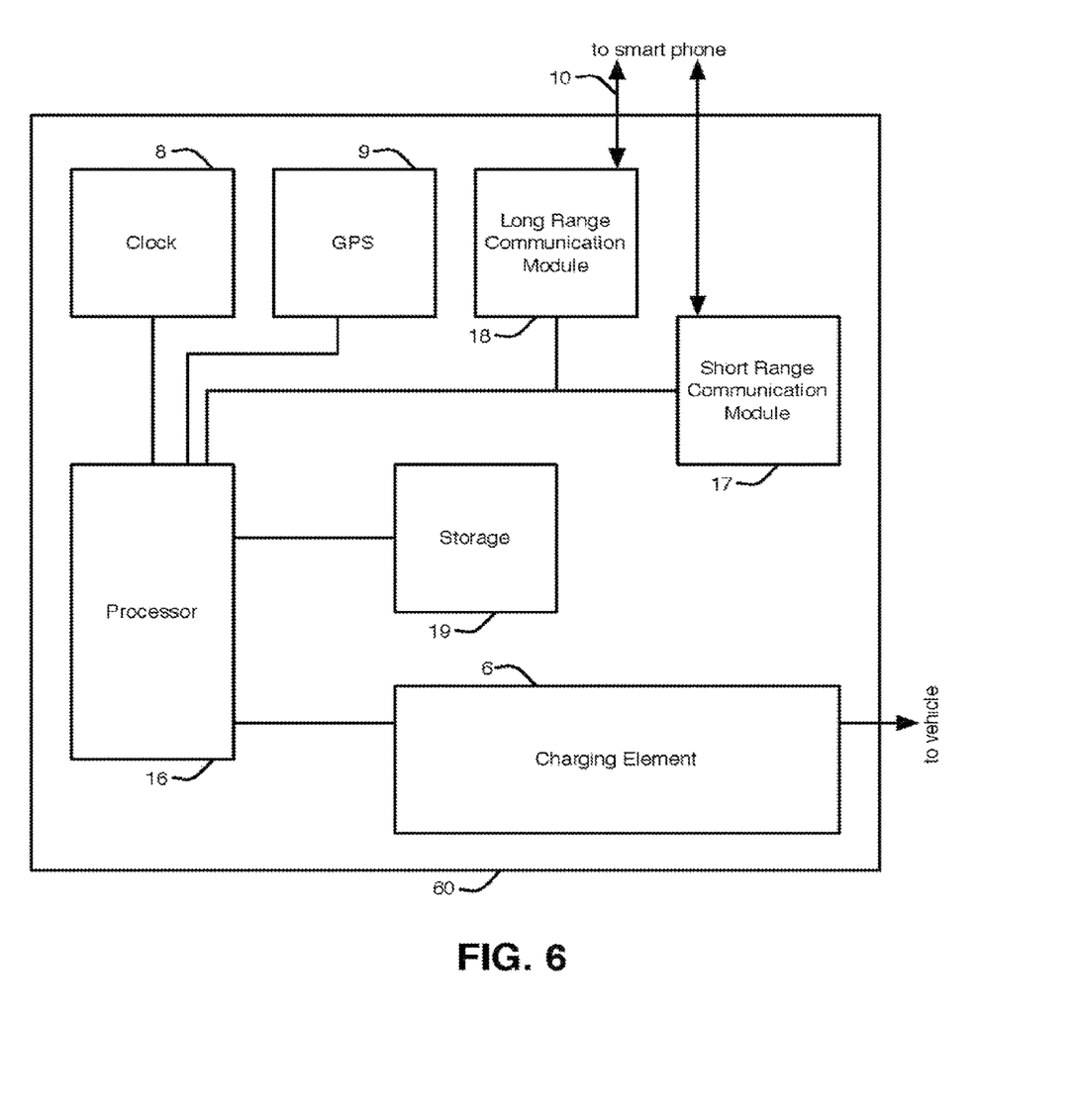
FIG. 6 shows a block diagram of a charger that might be used with the present invention.

FIG. 6 shows a block diagram of a charger system 60 that is an embodiment of the charger of the present invention. A processor 16 is tied to a communication module 17 that performs short-range communication with a cellular telephone or smart phone and allows certificate 5 to be transferred from the cellular/smart phone through processor 16 to a storage module 19. The processor 16 or storage module 19 may comprise the private key for the charger 6 and/or may store a public key (e.g., of server 15) to verify digital signatures (e.g., those made with the server's private key). The storage module 19 can be any type of disk, memory or mass storage device. A clock 8 and/or GPS receiver 9 are also connected to the processor 16 to provide the current time. The processor 16 directly controls access to a charging element 6, i.e., enabling charging element 6 when a current certificate 5 has been presented, and disabling charging element 6 otherwise. An optional long-range communication module 18 can communicate with the Internet either by placing a cellular telephone call or with Wi-Fi or the like.

Optionally, the application on a smart phone 4 can energize short-range communication when the local GPS in the phone indicates that the phone is near the target charger 6.

The smart phone can also optionally signal that the vehicle needs a charge, or that a particular charge reservation time is approaching. The system of the present invention can also optionally track motorists' visits and purchases at retail stores in a mall or shopping center, and have automatic credits that can be added to the smart phone good toward future vehicle charging paid for by merchants as an incentive to purchase from their stores.

Figure 7:
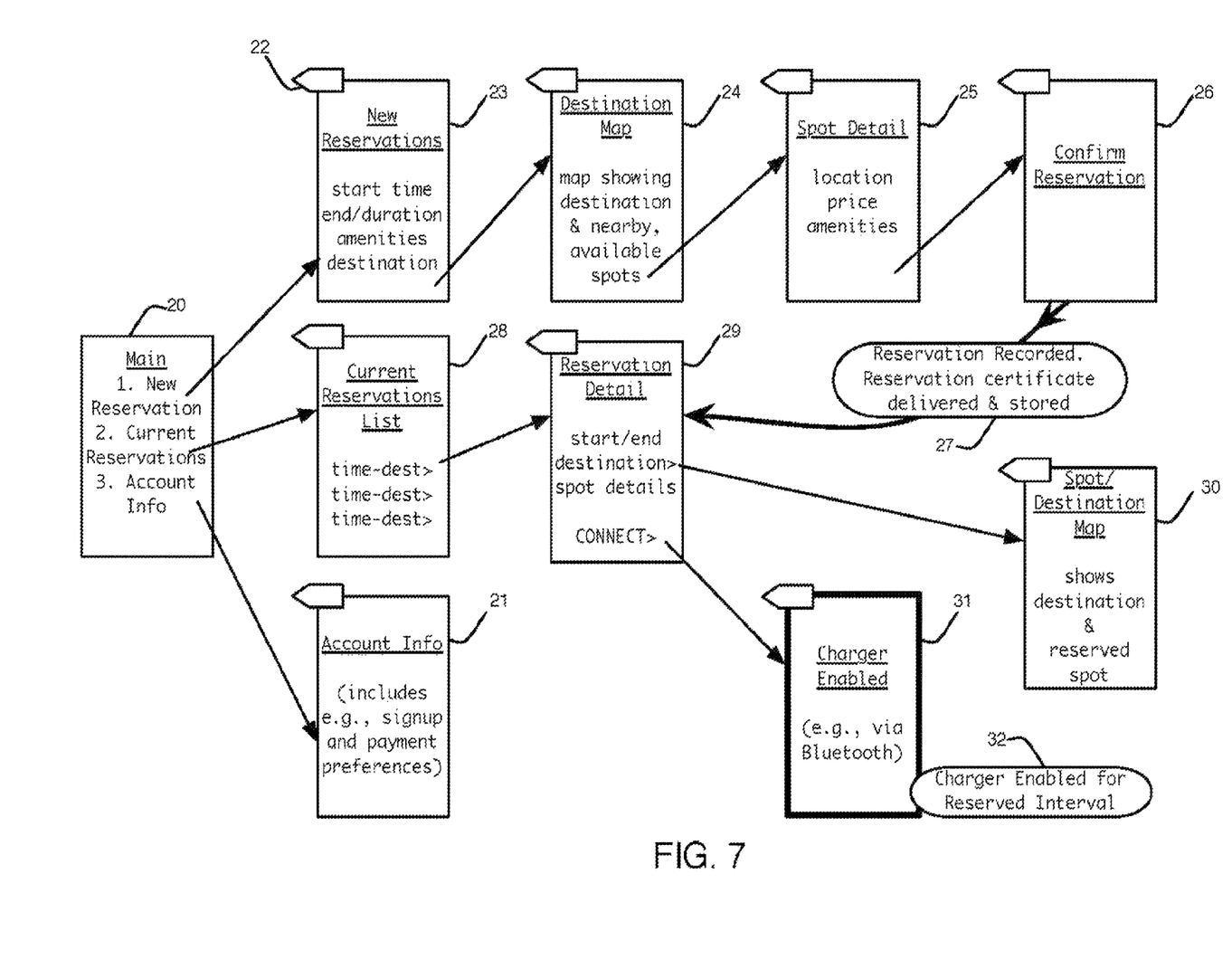
FIG. 7 shows a block diagram of an embodiment of a smart phone application.

In US Patent Application Publication 2007/0008181, Rollert et al. teach a "System and Method For Optimizing the Utilization Of Space," primarily parking spaces, by allowing a reservation to be made through the Internet. FIG. 7 shows how the present invention represents an improvement to the system and method of Rollert et al., enabled by a smart phone application that could, for example, run on an iPhone by Apple, Inc. of Cupertino, Calif. or other smart phone. Such an application would have a various screen views for performing such functions as making a new reservation, examining current reservations, and maintaining the patron's account. Some portions of the application require connectivity to the Internet to operate, but other portions may operate based on locally stored information. A few related operations, including examining current reservations, should be able to operate without Internet access, as the user may require immediate access to these operations, but be in a location such as in a parking garage where Internet access such as cell communication or Wi-Fi may not be provided.

In the diagram of FIG. 7, a main application view 20 is shown to offer three options: New Reservation (for creating a new reservation), Current Reservations (for examining and using reservations already made), and Account Info (for creating and editing appropriate account information). FIG. 7 shows a smart phone application block diagram for an embodiment in which Internet device 2 and smart phone 4 are the same device: In another embodiment, the reservation-making portion of the application may run on Internet device 2 and the current reservation portion of the application may run on the smart phone 4.

The patron would have selected the Account Info 21 at least once to create or otherwise associate an account with the patron's smart phone 4. An account may have associated payment preferences and perhaps acceptance of legal agreements. Payment preferences might include a credit card account, or a bank account. Another payment preference would provide permission to pre-charge a patron's credit card or bank account and subsequently allow the system to operate using micropayments made against that pre-charge amount. The parking reservation server 15 (or web site 12) or another server with which it has communication (not shown) would maintain the micropayment accounts for each patron and apply their funds to charges for parking. The micropayment accounts would be settled daily or with a different period, or whenever the pre-charged amount has been consumed.

Once the patron's account has been enabled, the patron can access the views for creating a new reservation.

The New Reservations 23 screen accepts a start-time, an end-time (or duration), and a destination.

Required amenities can be selected, including for the present invention, available charging for an EV (which may further include a selection for Level 1 or Level 2 charging, for instance). The destination may be an actual parking location, but more commonly (and as illustrated herein) it is the patron's destination for which nearby parking is sought.

As with each screen in this diagram other than the Main view 20, there is a 'back' arrow 22 atop the screen including the New Reservations screen 23. The back arrow 22 is a user interface element that permits the patron to move back up the hierarchy to access screens and their interfaces higher up.

Once a destination has been entered into the New Reservation screen 23, the user may be presented with the Destination Map screen 24 showing a map with the destination marked and parking spots nearby shown and selectable. The spots shown may be only ones having the stated amenities and that are available to be reserved for the interval entered such as beginning from the start-time and available for the duration or until the end-time. Current information regarding parking spot availability requires communication with the server responsible for maintaining reservations for that spot, which may be server 15, web site 12, or some other server.

Alternatively, the spots may be shown in a list, which may be sorted by their distance from the indicated destination, or by price, or a combination thereof.

The patron selects a parking spot, whether from a corresponding marking on the map, or from the spot list (not shown). Once selected, the Spot Detail screen 25 is shown, which includes information such as location, pricing, detailed amenities, and perhaps a picture of the specific parking location (or one representative of it).

If the patron does not like the parking spot presented, the back buttons allow returning to screens earlier in the interaction to make different selections, e.g., to choose a different spot or alter the start-time, etc.

If the patron does like the parking spot presented, he can confirm the reservation 26, which initiates a reservation request to the server. Upon successfully obtaining a reservation for an EV charging enabled parking location, the server in response can provide or authenticate 27 a reservation certificate 5 to be stored in the smart phone 4. For instance, in one embodiment, reservation certificate 5 comprises data representative of the reservation encrypted with the server's private key. In another embodiment, reservation certificate 5 comprises a digital signature by the server that authenticates data representative of the reservation. The completion of the reservation transitions the patron to a different region of the application screen hierarchy, and instead of being in the 'new reservation' branch (23-26), the interface jumps to a location in the 'current reservations' branch (28-31), such as the Reservation Detail page 29, showing the reservation just made.

Another way of getting to the Reservation Detail screen 29 begins back on the Main application view 20 when the patron selects the current reservations option. Upon doing this, the Current Reservations List 28 is shown, which lists all pending parking reservations, for example in order of the date and time at which the reservation starts. Besides the start time, each entry in the list should show some additional information to remind the patron of each instance, for example the destination may be presented.

Upon selecting one of the reservations from the Current Reservations List 28, the corresponding Reservation Detail screen 29 is shown, listing the same details that were selected and known when the reservation was made. Clicking on the destination entry on this screen can bring up a Spot/Destination Map screen 30, showing the location of the parking spot with respect to the destination.

The Reservation Detail screen 29 also presents a connect option to direct the smart phone application to attempt communication with the EV charging system 4 (or other parking spot amenity system or access device 11, e.g., a hotel room lock) and to provide the reservation certificate 5 to the charger 6 or device (11), thereby enabling it 32 for the interval of the reservation.

The Charger Enabled screen 31 can be used to monitor the connection attempt and confirm activation resulting from a successful connect action, and may also initiate a timer (not shown) on the smart phone to generate an alert as the parking interval is about to expire.

Digital Certificate and Reservation

In addition to hotel room keys, the technology is also well suited to locks for extended stay locations, particularly unattended ones, including those marketed through websites such as Airbnb, Inc. of San Francisco or VRBO.com (i.e., Vacation Rentals by Owner), owned by a subsidiary of Expedia, Inc. The present invention can work in a number of different environments, and is particularly valuable where there is no, or little, connectivity with the Internet, since it does not rely on continuous network communications with the digital lock or with the guest's mobile device over cellular or WiFi networks. Once the digital key is sent to the guest's mobile device, commonly over the cellular network, then the operation can rely solely on close range wireless communication (e.g., via BlueTooth, or WiFi) between the mobile device and the lock.

Alarm System

The present invention can also be paired with an alarm system. A typical home alarm system is comprised of a main base, which is usually plugged into the wall and may have the ability to connect to the Internet (or a dedicated network) through a wireless or wired connection, which may include the cellular network. Additionally, such an alarm system may comprise sensors to detect whether the premises are secure. At doors and windows, for example, a magnet and a magnetic switch pair are commonly used to monitor a door or window as being closed or not. An accelerometer may be used to detect a door being opened or closed. Such sensors and their associated circuitry and communications module can be battery powered and in wireless communications with a base station. A motion sensor, for example one based on infrared sensors, can sense a person moving in a particular area. Typically, there is a keypad for data entry, which may be wired or wireless and is in communication with the base station.

Another system that is based on synchronous codes has an advantage because it does not require BlueTooth Low Energy (BLE) and does not require a phone application. The digital lock only requires a keypad to accept synchronous codes sent to the mobile device via a text message or email.

To assert authorized entry, that is, to disable the alarm, the guest's smartphone connects by short range wireless (e.g., via BlueTooth) and the digital certificate is provided to the alarm system. If the certificate is currently valid, the alarm system is disabled. The guest might also get a phone call from the central office of the alarm company if they do not timely detect a valid code at the base station. If the authorized guest is actually at the premises and is having trouble with the alarm system, the alarm company can instruct the guest how to provide the digital certificate or other code. However, if the authorized guest is not at the premises, then an unauthorized intrusion has occurred and other security measures should be taken (e.g., calling the police). The operation of the alarm by the digital certificate may be instead of, or in addition to, operation of the door lock by the same or different digital certificate.

In an embodiment where both a door lock and an alarm system, both of the present invention, a property owner sends at least one valid digital certificate "key" to his authorized guest, usable both with the door lock to unlock the door and with the alarm system to disarm the property's alarm system. In one embodiment, the valid digital certificate or code may contain a passcode readable by the guest on the screen of the smartphone app, the passcode to be keyed by the guest into the keypad of the alarm system. In another embodiment, the digital certificate may be sent directly to the alarm monitor via a wireless communication protocol, such as BlueTooth.

In some cases, a digital room key may be issued and received by a would-be guest in response to a legitimate reservation, but subsequently the reservation is cancelled. At the time of cancellation, the digital room key is revoked. Revocation can be completed in two ways: Either a message can be sent to the application that received the key, compelling the application to delete the key; or the application can poll a revocation server, to inquire whether the key is still authorized.

In some embodiments, a poll of the revocation server can be triggered by proximity: For example, if a key to a cabin in the woods is issued, but the cabin is known to have spotty, unreliable cellular coverage, a poll may be triggered as the guest moves into proximity of the cabin, but before the cellular coverage drops off. In some embodiments, a geo-fence can be defined around regions of poor cellular coverage, and approaching such a geo-fence that contains the target property associated with a digital certificate key would trigger a check of the revocation server.

Thus, canceling a reservation at the server system level results in message signaling that the key has been revoked, typically causing the key to be deleted from the cancelling guest's smartphone. This requires no direct network connection to the room's digital lock in order to disable a digital room key. However, if a guest were to close cellular communication (for example by engaging "airplane mode" to block all wireless communication, or merely turning the smartphone's cellular communication off), then the revocation message would not be received by his smartphone. In this case, arrival at the cabin in the woods would find that even if cellular communication was reactivated (e.g., canceling "airplane mode" or turning cellular communications back on) that there is no cell service. Thus, no revocation message can be received. In this circumstance, the smartphone carries a digital certificate that appears valid, but which corresponds to a cancelled reservation, and which potentially could gain a person unauthorized access to the door lock corresponding to the canceled reservation.

The inventors have devised herewith several embodiments of the digital room key product, U.S. Pat. No. 9,373,205, that serve to control access to the room and the room's objects and occupants based on a reservation system with a start time and a stop time. The preferred embodiment includes code installed in the smartphone, or any mobile device, along with the digital key application. The code in the application is written specifically to prevent a guest from copying the digital key, or sending the key to another mobile device, unless authorized by the system.

The code in the application is also written to sense when the phone is set to enable BlueTooth (BT), but disable other communication channels, such as cellular or WiFi connections. The description herein of a "cellular/WiFi disable only" action is a very specific action taken by the key holder that modifies settings on his or her mobile device. This is a change involving a choice of settings that is very unusual for everyday hotel or apartment guests and would lead a reasonable person to conclude that the only purpose of that combination of cellular/WiFi disable only mode of the mobile device's communication settings would indicate that the guest is attempting to spoof the system and thus get unauthorized access to a lock and a secure space that the key holder previously did have access to under legitimate conditions, for example, before he canceled the reservation.

In the preferred embodiment, if the mobile device application senses that the phone's BlueTooth is enabled, but cellular and/or WiFi is disabled, then the app would automatically disable the current digital room key resident in the mobile device. If the entire phone were powered down, or if the BlueTooth and the cellular were both disabled at the same time, then the digital room key would remain enabled during the entire, pre-arranged length of stay. If "airplane mode" is chosen, then all wireless communications would be disabled and the digital room key would remain enabled for the duration of length of stay. This is because entering "airplane mode" for a period of time, or turning the device off is not a suspicious activity because it disables ALL wireless communications to the mobile device, including BlueTooth.

Steps to New Process Using Digital Room Key Technology:

Upon successful guest authentication, a unique digital key in the form of a "time coded" certificate and reservation for future access is sent from the main server to the guest's mobile device that is running the digital key application.

The key resides in the mobile device and is used intermittently during the approved length of stay, as specified in said time coded digital certificate reservation and key.

In the present embodiment of the technology, there is no communication with the target digital room or apartment or house lock other than via close range radio frequency (RF), such as BlueTooth, between the guest's mobile device and the target lock.

In the event that a reservation is canceled at the network server prior to the end of the planned length of stay, as time coded into the digital key, and the network cannot contact the mobile device through normal cellular or WiFi channels in order to disable the resident digital key attached to the reservation; the key will be disabled automatically after a defined period of time of said no network connection. This security step will block an unauthorized guest from using an authentic key that was canceled by the guest at the server, but not yet disabled on the guest's mobile device. This is in order to prevent unauthorized access to the said secure space or living quarters. It is important to note that the same digital key reservation technology could be used for a storage unit with the understanding that the "length of stay or access" could be months or years.

The digital room key application can include geo fencing and local BlueTooth or WiFi beacons in order to offer micro way-finding help and guide the authorized guests or renters to their rooms, or homes, or apartments or storage units.

If the phone is turned off for a period of time, as soon as the phone is reactivated the application will attempt to connect to the network and inquire for current key status, in other words, if there is any change to the digital key status. If the mobile device's cellular and WiFi channels are open, but network unavailable, then the key remains valid for a pre-defined period of time, based on the property owner's policy. However, if the network server cannot communicate with the guest's mobile device after a predetermined period of time, the mobile device application will be coded to disable the digital key resident on the mobile device. The authenticated guest will be notified via text or voice message to contact the network and request a new, valid digital key. If the guest is re-authenticated, a new key will be issued with the balance of the reserved time encoded into the key.

For security purposes, the application will be designed and coded to allow monitoring of the status of the phone's BlueTooth, WiFi and Cellular communications channels on the guest's mobile device. There is no monitoring of content; only the status of the channels.

In certain instances, the guest might disable cellular and use WiFi for telephonic activities. This is acceptable. In certain instances, the guest might disable all communication channels in order to preserve battery. The guest might turn off his mobile device. This action is also acceptable.

In the instance where the app is running, and there is an authenticated digital key with an active length of stay, and the cellular and WiFi channels are disabled, while the BlueTooth remains enabled, then the digital key residing in the mobile device will be automatically disabled.

In another embodiment, the lock gets its local timestamp from an FM radio chip or from a time stamp via wireless communication with the Internet, such as via WiFi. If the local timestamp fails for any reason by virtue of the WiFi router or Internet being down, or if the FM radio chip is unable to receive its timestamp signal, then the lock will accept the local timestamp sent to it via wireless protocol, such as BlueTooth, from the guest's mobile device. Once accepting the local timestamp, the lock can determine if the digital key also sent from the guest's device to the lock via BlueTooth signal is valid or invalid for a specific, reserved date and time.

Multiple Guests in a Room

The inventors contemplate a system in which a digital key with a reservation can be authorized to be shared among multiple mobile devices for access to a digital lock to that room or to a digital lock to a residence or storage area. This process will depend on authenticated registration of multiple mobile devices under one user account, such as a family or business account.

Several descriptions and illustrations have been presented to aid in understanding the features of the present invention. One skilled in the art will realize that numerous changes and variations are possible without departing from the spirit of the invention. Each of these changes and variations is within the scope of the present invention.

What is claimed is:

1. An access control system comprising:
  a) an access device comprising a communication module connected to a processor having control of a door lock;
  b) a secure reservation interface to receive a reservation request from a first device for a reservation at a given destination, the reservation interface comprising one or more screens for receiving a selection of a location at the destination and an interval of the reservation;
  c) a reservation server, in communication with the reservation interface and a network, to:
    receive the reservation request for the destination, the reservation request including a selected location at the destination and an interval of the reservation;
    issue a reservation certificate describing the interval of the reservation based on the reservation request and the selected location; and
    transmit, via the network, from the reservation server to a second device, the reservation certificate and a communication setting corresponding to the access device;
  d) an application installed on the second device to receive the reservation certificate and the communication setting corresponding to the access device, wherein the application determines whether the reservation certificate is revoked on the basis of a further communication with the reservation server, wirelessly transmits the reservation certificate to the access device using the communication setting upon receipt of a command to activate the door lock if the reservation certificate is not revoked; and e) wherein, if the reservation certificate is not revoked, the access device receives the reservation certificate from the application based on use by the application of the communication setting, and the processor activates the door lock based on at least the receipt of the reservation certificate, otherwise the processor does not activate the door lock.

2. The system of claim 1 wherein the application deletes the reservation certificate when the reservation certificate is revoked.

3. The system of claim 1 wherein said further communication from the reservation server is a revocation message from the reservation server.

4. The system of claim 1 wherein said further communication from the reservation server is a response by the reservation server to a poll of the reservation server by the application.

5. The system of claim 4 wherein the poll is triggered on the basis of proximity to the access device.

6. The system of claim 4 wherein the poll is triggered based on proximity to an area of poor communication coverage, the area containing the access device.

7. The system of claim 6 wherein a geo-fence surrounds the area and proximity to the area is the geo-fence.

8. The system of claim 4 wherein the poll is triggered on the basis of a geo-fence associated with the reservation certificate.

9. The system of claim 1 wherein the second device comprises:
 a first wireless module used for said further communication with the reservation server;
 a second wireless module used for wireless communication with the access device; and,
 wherein the application determines whether the reservation certificate is revoked on the further basis of the first wireless module being disabled and the second wireless module being enabled.

10. The system of claim 9 wherein the first wireless module provides at least one of a cellular connection and a WiFi connection.

11. The system of claim 9 wherein the second wireless module comprises a Bluetooth transceiver.

12. The system of claim 1 wherein said further communication from the reservation server is a response by the reservation server to a poll of the reservation server by the application and the poll is triggered on the basis of the second device being turned on after having been off.

13. The system of claim 12 wherein the poll is triggered on the further basis of the second device having been off for at least a predetermined amount of time.

14. The system of claim 1 wherein the second device comprises:
 a first wireless module used for said further communication with the reservation server; and,
 wherein said further communication from the reservation server is a response by the reservation server to a poll of the reservation server by the application and the poll is triggered on the basis of the first wireless module transitioning from disabled to enabled.

15. The system of claim 14 wherein the poll is triggered on the further basis of the first wireless module having been disabled for at least a predetermined amount of time.

16. The system of claim 1 wherein the second device comprises:
 a first wireless module used for communication via the network; and,
 wherein the application determines whether the reservation certificate is revoked on the further basis of the first wireless module being enabled but the network being unavailable for at least a predetermined amount of time.

17. The system of claim 1 wherein the second device comprises:
 a first wireless module used for said further communication with the reservation server; and,
 wherein the application determines whether the reservation certificate is revoked on the further basis of, for at least a predetermined amount of time, the first wireless module being enabled and the first wireless module being enabled but the network being unavailable.

18. The system of claim 1 wherein the access device comprises a unique identifier, and wherein at least the reservation certificate or the communication setting contains the unique identifier.

19. The system of claim 1 wherein the second device comprises a smartphone.

20. The system of claim 1 wherein the reservation detail interface comprises one or more screens for selecting at least a start time and a stop time, or a duration for the reservation.

* * * * *